No. 649,432. Patented May 15, 1900.
T. BURGETT.
SCRAPER.
(Application filed May 15, 1899.)
(No Model.)

WITNESSES
E. J. Nottingham
G. F. Downing

INVENTOR
T. Burgett
By H. A. Seymour
Attorney

UNITED STATES PATENT OFFICE.

THEODORE BURGETT, OF WINTHROP, MINNESOTA.

SCRAPER.

SPECIFICATION forming part of Letters Patent No. 649,432, dated May 15, 1900.

Application filed May 15, 1899. Serial No. 716,907. (No model.)

*To all whom it may concern:*

Be it known that I, THEODORE BURGETT, a resident of Winthrop, in the county of Sibley and State of Minnesota, have invented certain new and useful Improvements in Scrapers; and I do hereby declare the following to be a full, clear, and exact description of the invention, such as will enable others skilled in the art to which it appertains to make and use the same.

My invention relates to an improvement in scrapers, and more particularly to horse-rakes, the object of the invention being to provide a scraper for manure, straw, hay, and the like which will be extremely simple in construction, cheap to manufacture, neat in appearance, strong and durable, and most effectual when in operation.

With this object in view the invention consists in certain novel features of construction and combinations and arrangements of parts, as will be more fully hereinafter described, and pointed out in the claims.

Figure 1:
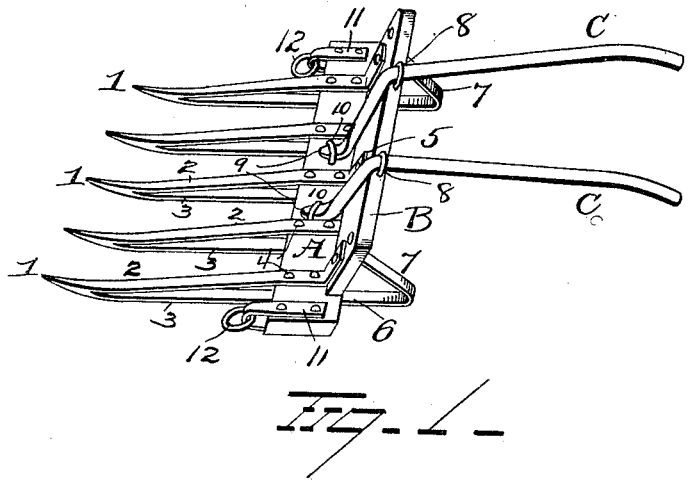
Figure 2:
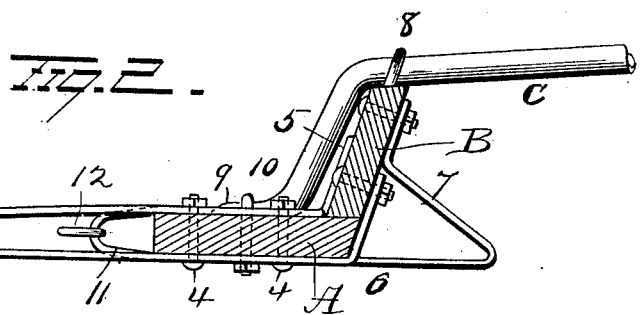

In the accompanying drawings, Figure 1 is a perspective view illustrating my improvements, and Fig. 2 is a view in section of same.

A represents the head of my improved scraper or rake, and B a fender secured to the rear edge of the head and disposed edgewise and inclined rearwardly, as shown. A series of split fingers 1, comprising the upper members 2 and lower members 3, are secured, respectively, to the upper and lower faces of the head and secured together by means of bolts or rivets 4, passing through the two members 2 and 3 and through the head A. The lower members 3 of the fingers may be secured to the rear face of the fender B, as shown. The upper members 2 of the central and end fingers 1 are bent upward at their inner ends and secured to the front face of fender B, as shown at 5, and the lower members 3 of the end fingers 1 project rearward behind the fender B a suitable distance, as shown at 6, and are then bent forward and secured to the rear face of fender B to form braces 7 for said fender.

Suitable eyes or loops 8 are secured to the upper edge of the fender B and spaced apart, and my improved handles C are secured in said loops or eyes 8. The forward ends of the handles C are bent downward approximately parallel with the fender B and are flattened at their lower ends, as shown at 9, and secured to the head A by means of suitable bolts 10.

The ends of the head A preferably project outward a short distance beyond the end fingers 1 and are provided with bars or strips 11, bent between their ends and secured to the upper and lower faces, respectively, of the head, and to said bars rings 12 are attached for the convenient attachment of a draft-animal for drawing the rake or scraper.

In the accompanying drawings I have shown the rake or scraper provided with five fingers 1; but I would have it understood that I do not wish to limit myself to any particular number of such fingers, but may employ more or less than five, according to the use to which the scraper or rake is to be put. I would also have it understood that I might construct all of the fingers 1 with rear brace portions 6 and 7 and may provide all the upper members 2 of the fingers 1 with brace portions 5 if it is found advisable to do so; but I have found for all ordinary purposes the rake or scraper as I have shown and described it is strong enough.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a scraper, the combination with a head and a fender located at the rear edge thereof, of a series of fingers, each comprising two members united at the forward ends, the upper member of each finger secured to the top face of the head and front face of the fender, and the lower member secured to the bottom of the head and projecting rearwardly therefrom, said projecting ends of the lower members of the fingers bent forwardly and upwardly and secured to the fender.

2. In a scraper, the combination with a head and a fender secured thereto, of fingers secured to the head, eyes on the fender, eyes on the head, and handles passing through the eyes on the fender, bent downwardly and provided at their lower ends with lugs engaging the eyes on the head.

In testimony whereof I have signed this specification in the presence of two subscribing witnesses.

THEODORE BURGETT.

Witnesses:
J. G. MEYER,
ED. H. HUEBNER.